United States Patent
Delbari et al.

(10) Patent No.: US 10,883,596 B2
(45) Date of Patent: Jan. 5, 2021

(54) REMOTE VEHICLE CONTROL

(71) Applicant: Ford Global Technologies, LLC, Dearborn, MI (US)

(72) Inventors: Ali Delbari, Windsor (CA); Scott J. Lauffer, Northville, MI (US); Zahra Khakpour, Canton, MI (US); John Ren, Troy, MI (US); Thomas Schultz, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 16/179,197

(22) Filed: Nov. 2, 2018

(65) Prior Publication Data

US 2020/0142395 A1    May 7, 2020

(51) Int. Cl.
| | |
|---|---|
| *F16H 59/24* | (2006.01) |
| *B60W 30/06* | (2006.01) |
| *B62D 1/28* | (2006.01) |
| *B60W 10/10* | (2012.01) |
| *B60W 10/18* | (2012.01) |
| *B60W 10/20* | (2006.01) |
| *B60W 50/00* | (2006.01) |
| *F16H 59/00* | (2006.01) |

(52) U.S. Cl.
CPC ............ *F16H 59/24* (2013.01); *B60W 10/10* (2013.01); *B60W 10/18* (2013.01); *B60W 30/06* (2013.01); *B62D 1/283* (2013.01); *B60W 10/20* (2013.01); *B60W 2050/0064* (2013.01); *B60W 2556/60* (2020.02); *B60W 2556/65* (2020.02); *F16H 2059/006* (2013.01)

(58) Field of Classification Search
CPC ........................................... G05D 1/0011–005
See application file for complete search history.

(56) References Cited

U.S. PATENT DOCUMENTS

| | | | |
|---|---|---|---|
| 5,161,422 A | 11/1992 | Suman et al. | |
| 6,957,989 B2 * | 10/2005 | Itoi ...................... | B60W 10/06 440/1 |
| 7,559,822 B2 * | 7/2009 | Byers ..................... | A63H 17/26 446/461 |
| 8,258,917 B2 | 9/2012 | Cai et al. | |
| 9,731,715 B2 | 8/2017 | Sans | |
| 2017/0227960 A1 | 8/2017 | Joyce et al. | |
| 2017/0349277 A1 * | 12/2017 | Erhart ................. | G05D 1/0022 |

FOREIGN PATENT DOCUMENTS

| | | |
|---|---|---|
| DE | 20300016 U1 | 3/2003 |
| DE | 102008018186 A1 | 10/2009 |
| WO | 2017046189 A1 | 3/2017 |

* cited by examiner

*Primary Examiner* — Erin D Bishop
(74) *Attorney, Agent, or Firm* — Frank A. MacKenzie; Bejin Bieneman PLC

(57) ABSTRACT

A remote vehicle control is activated. A throttle position on the control is maintained for a specified time. A transmission of a vehicle is engaged based on the throttle position.

19 Claims, 5 Drawing Sheets

REMOTE VEHICLE CONTROL

BACKGROUND

A computer may operate a vehicle in an autonomous mode in which each of the vehicle propulsion, braking, and steering are controlled by the computer. Thus, controls for a human operator can be omitted from the vehicle. However, even if the computer operates the vehicle in the autonomous mode most of the time, ability for a human to control or operate the vehicle may occasionally be useful.

DETAILED DESCRIPTION

Introduction

Figure 1:
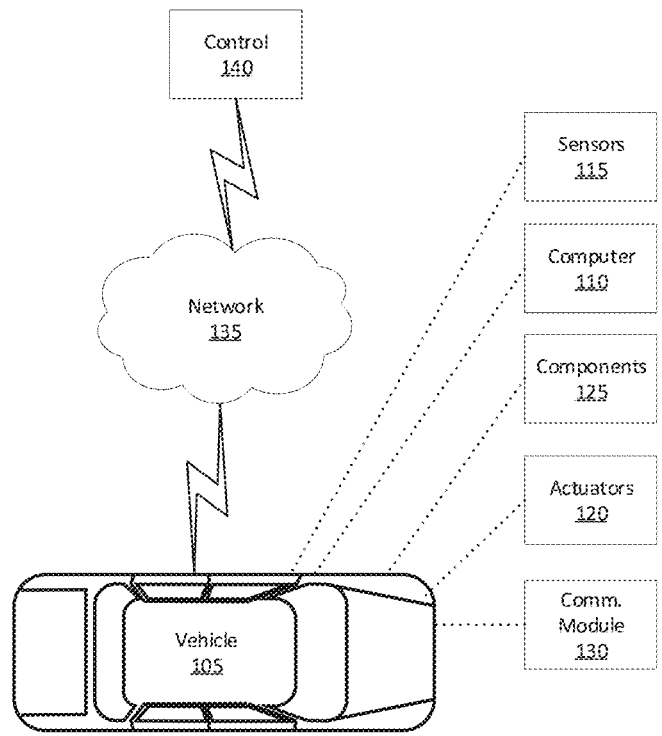
FIG. 1 is a diagram illustrating example remote vehicle control system.

A system can comprise a computer including a processor and a memory, the memory storing instructions executable by the processor to upon detecting that a remote vehicle control is activated, and a throttle position on the control is maintained for a specified time, engage a transmission of a vehicle based on the throttle position. The throttle can be moveable between a forward position, a rearward position, and a standstill position between the forward position and the rearward position. The computer can be programmed to detect that the throttle is in the standstill position, and, then, engage the transmission in a neutral mode. The computer can be programmed to detect that the throttle is moved from the standstill position to one of the forward position or the rearward position, and, then, engage the transmission in one of a drive mode or a reverse mode. The computer can be programmed to detect that the throttle is moved from one of the forward position or the rearward position to the other of the forward position or the rearward position, and, then, engage a brake. The computer can be programmed to, upon detecting the control is deactivated and that the vehicle speed is below the threshold, engage the transmission in a park mode. The computer can be programmed to, upon detecting that a vehicle speed is above a threshold, deactivate a timer. The computer can be programmed to, upon detecting that the vehicle speed is below the threshold, activate the timer. The computer can be programmed to, upon detecting the throttle position is changed prior to the specified time and that a vehicle speed is below a threshold, maintain the transmission in a neutral mode and reset a timer. The computer can be computer is programmed to, upon detecting the transmission is in a park mode and the control is activated, engage the transmission in a neutral mode and detect the throttle position on the control.

A system includes a remote vehicle control including activation means and a throttle moveable between a forward position, a rearward position, and a standstill position between the forward position and the rearward position, and a computer including a processor and a memory, the memory storing instructions executable by the processor to upon detecting that the remote vehicle control is activated, and a throttle position on the control is maintained for a specified time, engage a transmission of a vehicle based on the throttle position. The computer can be programmed to detect that the throttle is in the standstill position, and, then, engage the transmission in a neutral mode. The computer can be programmed to detect that the throttle is moved from the standstill position to one of the forward position or the rearward position, and, then, engage the transmission in one of a drive mode or a reverse mode. The computer can be programmed to detect that the throttle is moved from one of the forward position or the rearward position to the other of the forward position or the rearward position, and, then, engage a brake. The computer can be programmed to, upon detecting the control is deactivated and that the vehicle speed is below the threshold, engage the transmission in a park mode. The computer can be programmed to, upon detecting that a vehicle speed is above a threshold, deactivate a timer. The computer can be programmed to, upon detecting that the vehicle speed is below the threshold, activate the timer. The computer can be programmed to, upon detecting the throttle position is changed prior to the specified time and that a vehicle speed is below a threshold, maintain the transmission in a neutral mode and reset a timer. The computer can be programmed to, upon detecting the transmission is in a park mode and the control is activated, engage the transmission in a neutral mode and detect the throttle position on the control. The system can include a plurality of controls, and the computer can be programmed to, upon detecting that the transmission is in a park mode and one of the controls is activated, detect the throttle position on the one control.

Exemplary System Elements

FIG. 1 is a block diagram of an example system 100, including a vehicle computer 110 programmed to detect that a remote vehicle control 140 is activated and a throttle position is maintained for a specified time, and to engage a transmission 125 based on the throttle position. The remote vehicle control 140 can be programmed to transmit the throttle position to the vehicle 105. Manual operation of a vehicle 105 typically requires control interfaces, e.g., steering wheel, gear shift, etc., which are expensive, complex, and can consume significant space within the vehicle 105. Yet in an autonomous vehicle such interfaces are at most occasionally needed. Advantageously, therefore, the remote vehicle control 140 can replace control interfaces typically included in vehicles. The remote vehicle control 140 may not directly touch the vehicle 105 and can transmit a throttle position that allows a user to control operation of the vehicle 105. The vehicle computer 110 can thus replace control interfaces and engage the transmission 125 of the vehicle 105 to allow the user to operate a vehicle 105 in a non-autonomous mode.

A vehicle 105 includes the vehicle computer 110, sensors 115, actuators 120 to actuate various vehicle components 125, and a vehicle communications module 130. Via a network 135, the communications module 130 allows the vehicle computer 110 to communicate with one or more remote vehicle controls 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission 125, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The transmission component 125 is engageable in one of a drive mode, a reverse mode, a neutral mode, or a park mode. The computer 110 may be programmed to actuate a transmission controller of the vehicle 105, e.g., an ECU, to engage the transmission 125 in one of the modes. For example, the vehicle computer 110 may determine the mode of the transmission 125 when the vehicle computer 110 is operating the vehicle 105 in an autonomous mode. The vehicle computer 110 can actuate the transmission controller to engage the transmission 125 in the drive mode to propel the vehicle 105 forward. The vehicle computer 110 can actuate the transmission controller to engage the transmission 125 in the reverse mode to propel the vehicle 105 backwards, i.e., in reverse. The vehicle computer 110 can actuate the transmission controller to engage the transmission 125 in the neutral mode to allow the vehicle 105 to be moved by an external force, e.g., to be towed. The vehicle computer 110 can actuate the transmission controller to engage the transmission 125 in the park mode to prevent movement of the vehicle 105. As another example, the vehicle computer 110 may actuate the transmission controller to engage the transmission 125 in one of the modes based on the throttle position when the vehicle computer 110 is operating the vehicle 105 in the non-autonomous mode, i.e., the vehicle computer 110 is communicating with the remote vehicle control 140, e.g., through wired or wireless communications, as described below.

The vehicle computer 110 can, for example, communicate with the remote vehicle control 140 through wired communications when the remote vehicle control 140 touches, i.e., directly or indirectly, the vehicle 105. For example, the user can connect a wire to each of the remote vehicle control 140 and the vehicle 105, i.e., the remote vehicle control 140 indirectly touches, e.g., through the wire, the vehicle 105. As another example, the remote vehicle control 140 can be mounted to, i.e., the remote vehicle control 140 directly touches, the vehicle 105, e.g., a vehicle body, an instrument panel, a center console, etc. In this circumstance, the remote vehicle control 140 can be connected, e.g., to an 8-pin connector. When the remote vehicle control 140 is mounted to the vehicle 105, the vehicle 105 may include a cover (not shown) moveable between a closed position and an open position. The cover may be in the closed position and extend over, i.e., prevent user access to, the remote vehicle control 140 when the vehicle computer 110 is operating the vehicle 105 in the autonomous mode. The user may move the cover to the open position, e.g., to access the remote vehicle control 140, to operate the vehicle 105 in the non-autonomous mode.

Alternatively, the vehicle computer 110 can communicate with the remote vehicle control 140 through wireless communications when the remote vehicle control 140 is physically disconnected from, i.e., lacking a direct or indirect connection with, the vehicle 105. The user can be in physical contact with the vehicle 105, e.g., sitting in a passenger cabin of the vehicle 105, or external to the vehicle 105, e.g., not physically touching the vehicle.

To prevent an intruder computer from controlling the vehicle 105, the vehicle computer 110 may be programmed to authenticate a remote vehicle control 140 that is activated to control the vehicle 105 operation. The vehicle computer 110 may be programmed to perform an authentication based on a key, e.g., a combination of numbers and/or characters, received from the remote vehicle control 140 upon communicating with the vehicle 105. In another example, the vehicle computer 110 may be programmed to receive, from the remote vehicle control 140, a request including an access code, e.g., a secret code known to certain parties such as vehicle distributors, e.g., dealers, for activating a vehicle 105 non-autonomous mode. The vehicle computer 110 may activate the vehicle 105 non-autonomous mode upon determining that the received access code matches an expected access code, e.g., based on stored information in the vehicle computer 110.

In one example, if the vehicle computer 110 determines that the received access code matches an expected access code, then the vehicle computer 110 may activate a vehicle 105 non-autonomous mode. For example, the vehicle computer 110 may be programmed to control the vehicle 105 operation based on commands received from the remote vehicle control 140. In another example, the vehicle computer 110 may additionally authenticate the remote vehicle control 140 after the access code is verified. Alternatively, the vehicle computer 110 may be programmed to first authenticate the remote vehicle control 140 and then proceed to verify the access code before activating a vehicle 105 non-autonomous mode.

Authentication of a digital communication or message as discussed herein means implementing a scheme for determining an authenticity (or lack thereof) of the communication or message, e.g., a message from the remote vehicle control 140 to the vehicle computer 110 indicating a throttle position. Various known techniques such as an authentication signature (or digital signature) may be used for authentication. A valid authentication signature included in a received message may give the vehicle computer 110 a reason to conclude that the message was created by a known sender, e.g., a known remote vehicle control 140.

For example, the remote vehicle control 140 may be programmed to perform the authentication by sending a message including an authentication signature to the vehicle computer 110. The authentication signature may be based on data, known to both parties, e.g., an identifier of a sender, a local time, etc., and/or an encryption/decryption key. Thus, a receiver can verify the authentication signature based on the encryption key, the decryption key, and/or the known data such as the remote vehicle control 140 identifier.

The vehicle computer 110 may be programmed to receive a message sent from the remote vehicle control 140 and authenticate the remote vehicle control 140 based on the authentication signature. In one example, the vehicle computer 110 may be programmed to authenticate the remote vehicle control 140 based on data stored in the vehicle computer 110 or otherwise accessible by the vehicle computer 110. For example, the vehicle computer 110 may authenticate the remote vehicle control 140 by determining whether the authentication signature is included in a list of valid authentication signatures stored in the vehicle computer 110 or a memory accessible by the vehicle computer 110. In another example, the vehicle computer 110 may determine an expected signature for the respective remote vehicle control 140, e.g., a combination of an identifier of the known remote vehicle control 140 and current time and verify whether the authentication signature of the received message includes the expected signature. In another example, the vehicle computer 110 may determine the expected signature based on a result of an operation, e.g., multiplication, of a remote vehicle control 140 identifier, current time, etc. In other words, the vehicle computer 110 may be aware of how the remote vehicle control 140 determines its authentication signature.

The vehicle computer 110 may engage the transmission 125 in any one of the drive mode, the reverse mode, the park mode, or the neutral mode when the vehicle speed is below the speed threshold. When the vehicle speed is above the speed threshold, the vehicle computer 110 may maintain the transmission 125 in one of the drive mode or the reverse mode. Alternatively, the vehicle computer 110 may command a transition of the transmission 125 engaged in one of the drive mode or the reverse mode to the neutral mode.

In addition, the vehicle computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, and/or to the remote vehicle control 140 (typically via direct radio frequency communications). The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with the remote vehicle control 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle computer 110 is programmed to determine a vehicle speed based on the sensor 115. For example, the sensor 115 may include a wheel speed sensor 115 that can transmit the vehicle speed to the vehicle computer 110. The vehicle computer 110 can compares the vehicle speed to a stored speed threshold. The speed threshold may be a maximum vehicle speed at which the vehicle computer 110 is permitted to communicate with the remote vehicle control 140 to change the operating mode of the vehicle 105, e.g., from the autonomous mode to the non-autonomous mode. In other words, the vehicle computer 110 can be programmed to communicate with the remote vehicle control 140 to change the operating mode of the vehicle 105 only upon determining that the vehicle speed is below the speed threshold.

Figure 2:
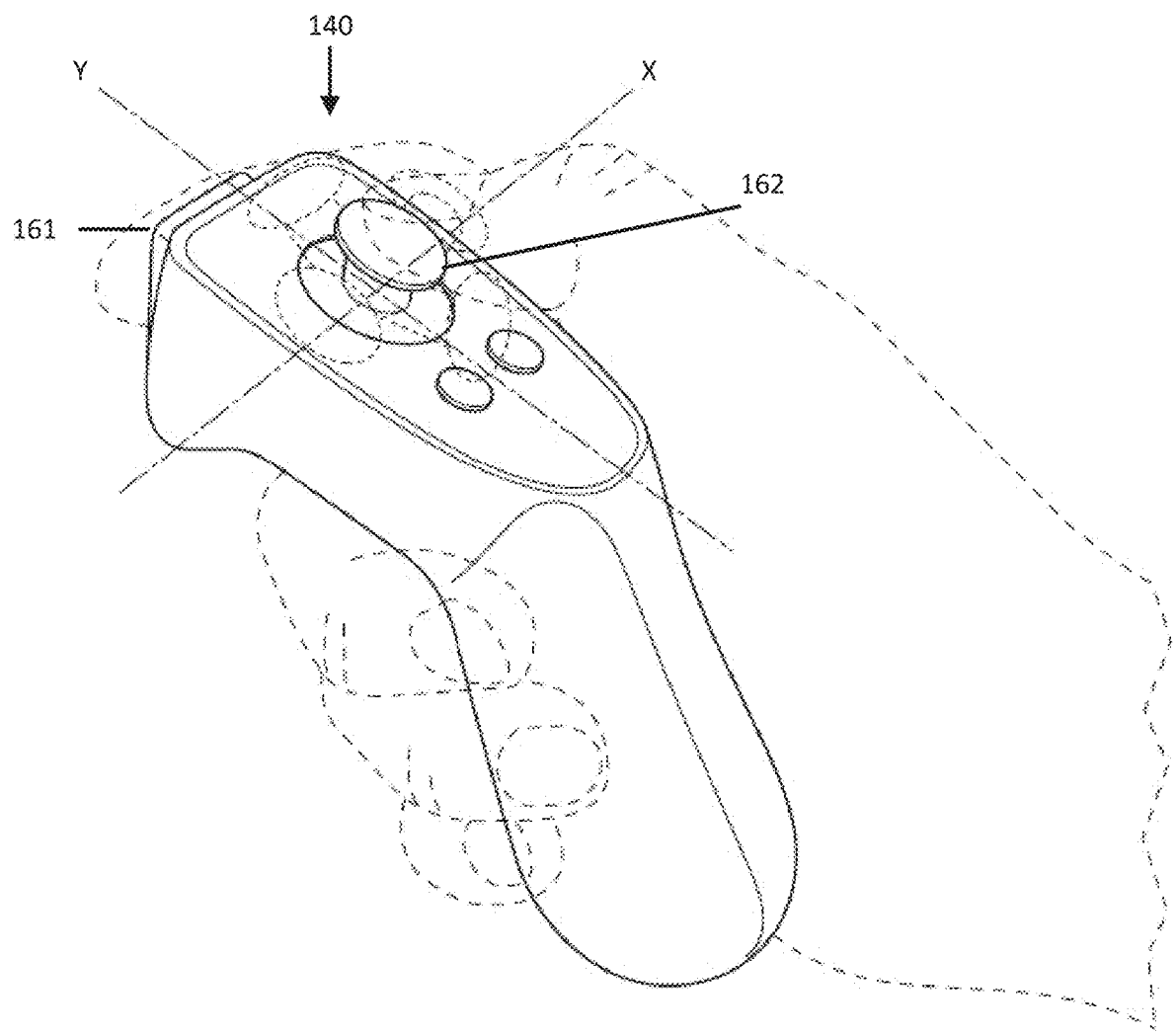
FIG. 2 is a block diagram illustrating an example remote vehicle control application area.

A remote vehicle control 140 includes a physical structure, such as a housing or other support structure on or in which sensors, as well as a communications module, computer, and input means can be housed, mounted, stored, and/or contained and powered, etc. One remote vehicle control 140 is shown in FIG. 2 for ease of illustrations, but the system 100 could and likely would include a plurality of remote vehicle controls 140. The remote vehicle control 140 can be portable, i.e., moveable by a user to multiple locations separate from the vehicle 105. Alternatively, the remote vehicle control 140 can be mounted to the vehicle 105, i.e., moveable by the vehicle 105 to multiple locations. Although not shown for ease of illustration, the remote vehicle control 140 also includes a power source such as a battery.

In the context of the present disclosure, the input means are one or more hardware components adapted to perform a mechanical or electro-mechanical function or operation—such as activating the remote vehicle control 140, changing throttle position, changing the steering control, etc. Non-limiting examples of the input means include a throttle 162, a steering control, and a switch 161.

The system 100 can determine an elapsed time since the throttle position was moved to one of the forward position or the rearward position. Upon a changed throttle position, e.g., from one of the forward position or the rearward position to the other of the forward position or the rearward position, one of the vehicle computer 110 or the remote vehicle control computer 155 can start a timer that measures the elapsed time since the throttle position changed. For example, the remote vehicle control computer 155 may transmit the throttle position to the vehicle computer 110 once the timer expires. Alternatively, the vehicle computer 110 may receive the throttle position and may maintain the mode of the transmission 125 until the timer expires. The vehicle computer 110 may maintain the mode of the transmission 125 until a specified time has passed, e.g., the timer expires. The timer is deactivated when the vehicle speed is above the speed threshold. In other words, the timer is activated when the vehicle speed is below the speed threshold. The timer is reset when the throttle position changes prior to the expiration of the timer.

Turning to FIG. 2, the remote vehicle control 140 can be a portable device including a memory, a processor. The remote vehicle control 140 further includes one or more input means to provide input to the remote vehicle control 140 such as a touchscreen, buttons, levers or joysticks, etc., as well as hardware and software for wireless communications such as are known and/or described herein. Accordingly, the remote vehicle control 140 may be any one of a variety of computing devices including a processor and a memory, e.g., a smartphone, a tablet, a game controller, etc. The remote vehicle control 140 may communicate with the vehicle communications module 130 via wireless communication. For example, the remote vehicle control 140 can be communicatively coupled to the vehicle communications module 130 with wireless technologies such as described above. In other words, the remote vehicle control 140 can communicate with the vehicle communications module 130, e.g., using Bluetooth®, Bluetooth® Low Energy (BLE), IEEE 802.11, vehicle-to-vehicle (V2V) such as Dedicated Short Range Communications (DSRC), etc. Alternatively, the remote vehicle control 140 can communicate with the vehicle computer 110 via wired communications, e.g., CAN. In this circumstance, the remote vehicle control 140 can, for example, be a portable device and a user can, e.g., connect a wire to each of the remote vehicle control 140 and the vehicle 105. As another example, the remote vehicle control 140 can be mounted to, i.e., fixed to, the vehicle 105.

The remote vehicle control 140 can be physically separate from the vehicle 105, i.e., lacks a permanent physical connection to the vehicle 105. A temporary wired connection, e.g., via a communications port or plug on the vehicle 105, is possible, but is typically omitted. Wireless communication efficiently allows for different remote vehicle controls 140 to be used with a same vehicle 105, or for a same remote vehicle control 140 to be used with different vehicles 105. For example, the system 100 may include a plurality of remote vehicle controls 140. Any one of the plurality of remote vehicle controls 140 may wirelessly communicate with the vehicle communications module 130 through wireless communications such as described above, e.g., when the one remote vehicle control 140 is activated.

The remote vehicle control 140 may include various input means. In some implementations, such as where the controller 140 is a game controller or the like, the input means are physical keys, joysticks, or buttons. In other instances, such as with a smartphone or other control 140 with a touch-sensitive display screen, the buttons may be virtually presented on the display screen and respond to user inputs provided by touching the virtual buttons. Further, by including a motion sensor 115, motions that are commands to propel the host vehicle 105 may be detected, e.g., by moving the remote vehicle control 140 along a y-axis of the remote vehicle control 140.

The input means can include a switch 161, a throttle 162, and a steering control. The switch 161 is engaged by the user, e.g., pressed with a finger or a palm of a hand, to activate the remote vehicle control 140, e.g., by receiving and/or transmitting signals to communicate with the computer 110. When the switch 161 is engaged, i.e., moved from a neutral position to which it may be biased, the remote vehicle control 140 can receive signals from and/or transmit signals to the vehicle computer 110, i.e., communicate with the computer 110. The switch 161 may be a toggle switch, a rocker switch, a tactile switch, a pushbutton switch, a limit switch, a capacitive touch switch, a resistance touch switch, a piezo touch switch, or a virtual switch.

The throttle 162 is moveable, e.g., along the y-axis, between a forward position, a rearward position, and a standstill position between the forward position and the rearward position. The throttle 162 is in the standstill position when the throttle 162 is substantially aligned with the x-axis. For example, the standstill position of the throttle 162 is shown in solid lines in FIG. 2. The throttle 162 is in the forward position when the throttle 162 is moved toward the switch 161, as shown in hidden lines in FIG. 2. The throttle 162 is in the rearward position when the throttle 162 is moved away from the switch 161, as shown in hidden lines in FIG. 2.

The throttle position is moved to control the propulsion of the vehicle 105, e.g., either forward or in reverse. Under normal conditions, i.e., no input from the user, the throttle 162 is in the standstill position, as shown in solid lines FIG. 2. In other words, the user moves the throttle 162, e.g., along the y-axis, to one of the forward position or the rearward position to control propulsion of the vehicle 105. The throttle 162 may be a joystick, a dial, a directional pad, a trackball, a touchpad, a pointing stick, a slider, or a virtual throttle 162, e.g., a slider on a touch screen.

Steering control may additionally be provided by the throttle 162. For example, the throttle 162 may be moveable, e.g., between the forward position, the rearward position, and the standstill position, along a y-axis, and the throttle 162 may be moveable along an x-axis transverse to the y-axis to control the steering of the vehicle 105, i.e., turn the vehicle 105. In other words, the throttle 162 may be have at least two degrees of freedom, which allows the throttle 162 to control the propulsion of the vehicle 105 by moving along the y-axis and the steering of the vehicle 105 by moving along the x-axis. Alternatively, the steering control may be separate from the throttle 162, e.g., a separate joystick or the like could be provided for steering control, which could otherwise operate to control steering as just described with respect to the throttle 162.

The throttle 162 or other steering control may be moveable, e.g., along the x-axis, between a left position, a right position, and a straight position between the left position and the right position. The steering output is in the straight position when the steering output, e.g., the throttle 162, is substantially aligned with the y-axis. For example, the straight position of the steering output, e.g., the throttle 162, is shown in solid lines in FIG. 2. The steering output is in the left position when the steering output, e.g., the throttle 162, is moved to the left, i.e., away from a palm of the hand as shown in hidden lines in FIG. 2. The steering output is in the right position when the steering output, e.g., the throttle 162, is moved to the right, i.e., towards from the palm of the hand as shown in hidden lines in FIG. 2.

The steering control is moved to control the direction the vehicle 105 travels, e.g., straight, turn left, or turn right. Under normal operating conditions, i.e., no input from the user, the steering control is in the straight position. In other words, the user moves the steering control, e.g., along the x-axis, to one of the left position or the right position. When the steering control is moved to one of the left position or the right position, the remote vehicle control 140 can transmit a signal to the vehicle computer 110. The vehicle computer 110 is programmed to actuate a steering component 125 to turn the vehicle 105 left or right, respectively.

The remote vehicle control 140 may be programmed, e.g., via software and/or firmware, to receive user inputs, e.g., the throttle position, the switch 161 is engaged, etc. In response to a user input, the remote vehicle control 140 may transmit data, representing the user input, to the vehicle computer 110. The vehicle computer 110 may generate commands based on the user input to actuate the transmission controller, e.g., to engage the transmission 125 in one of the modes based on the throttle position. For example, when the vehicle computer 110 is operating the vehicle 105 in the autonomous mode, the vehicle computer 110 may be programmed to ignore signals from the remote vehicle control 140 unless the transmission 125 is in a park mode and the switch 161 is engaged indicating that the vehicle 105 is ready to operate in a non-autonomous mode. Under these conditions, the vehicle computer 110 may be programmed to process the signal and generate commands to actuate the transmission controller to engage the transmission 125 in one of the modes based on the signal causing the vehicle 105 to operate in a non-autonomous mode.

Figure 3:
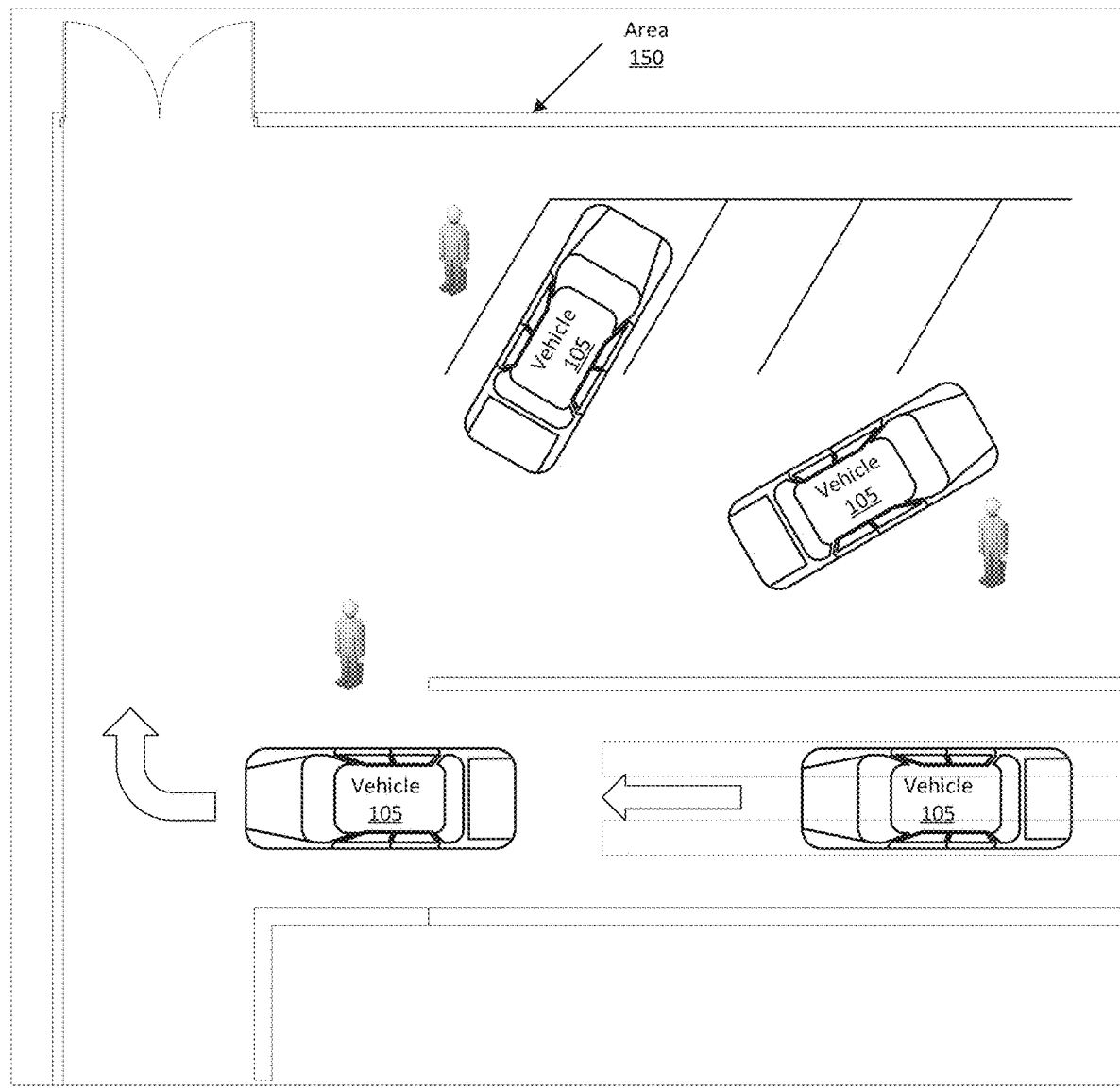
FIG. 3 is a diagram illustrating an example remote vehicle control.

Turning to FIG. 3, the remote vehicle control 140 can be provided to control the vehicle 105 during operation in an area 150. The area 150 could be an area where the vehicle 105 is operated within a confined space. Non-limiting examples include a garage, a warehouse, an assembly plant, a maintenance shop, and a shipping container.

FIG. 3 is a block diagram illustrating an example area 150 in which the vehicle 105 can be controlled with the remote vehicle control 140. At some points during operation, the vehicle 105 may be indoors, e.g., in a garage when being stored with a fleet of vehicles, during assembly at an assembly plant, etc. At such times, the vehicle computer 110 may be less effective at operating the vehicle 105 in the autonomous mode, e.g., because sensors 115 may not detect normal road indicators. As such, a user may control the vehicle 105, e.g., in the non-autonomous mode, with the remote vehicle control 140. In these situations, the area 150 may include a plurality of remote vehicle controls 140.

The vehicle computer 110 is programmed to detect the remote vehicle control 140 is activated, e.g., the switch 161 is engaged. Once the vehicle computer 110 detects that one remote vehicle control 140 is activated, the vehicle computer authenticates the remote vehicle control 140, as set forth above, to prevent an unauthorized control of the vehicle 105. Once the remote vehicle control 140 is authenticated, the vehicle computer 110 may detect the throttle position of the one remote vehicle control 140. For example, the remote vehicle control 140 can transmit data, e.g., via Bluetooth or some or wireless protocol, to the vehicle computer 110 specifying the throttle position. When a vehicle 105 and controller 140 are paired, communication between the vehicle computer 110 and other remote vehicle controls 140 is typically prevented, e.g., until the one remote vehicle control 140 is deactivated. Similarly, communication between the one remote vehicle control 140 and other vehicles is prevented, e.g., until the one remote vehicle control 140 is deactivated.

A user can activate a remote vehicle control 140 in the area to control a vehicle 105 in the non-autonomous mode, e.g., by engaging the switch 161. After activating the remote vehicle control 140, the vehicle computer 110 authenticates the remote vehicle control 140, and then operates the vehicle 105 in the non-autonomous mode. In the non-autonomous mode, the user can direct the vehicle 105, e.g., to a staging area, using the remote vehicle control 140. In other words, the remote vehicle control 140 can receive user input and transmit data representing the user input to the vehicle computer 110. For example, when the user moves the throttle 162 to one of the forward position or the rearward position, the remote vehicle control 140 transmits the signal to the vehicle computer 110. Upon receiving the signal, the vehicle computer 110 is programmed to actuate the transmission controller to engage the transmission 125 in one of the drive mode or the reverse mode, respectively. In this situation, the user can operate the vehicle 105 in the non-autonomous mode to drive the vehicle 105 either forward or in reverse, respectively.

Additionally, the user can move the steering control to the remote vehicle control 140 to steer, i.e., turn, the vehicle 105. In this situation, the remote vehicle control 140 transmits a signal to the vehicle computer, which can actuate a steering component 125 to turn the vehicle 105 based on the user input, e.g., the steering control is moved to one of the left position or the right position, respectively.

The user can deactivate the remote vehicle control 140 once the vehicle 105 is at a desired location, e.g., a staging area, within the area, e.g., by disengaging the switch 161. The vehicle computer 110 is programmed to actuate the transmission controller to engage the transmission 125 in the park mode when the remote vehicle control 140 is deactivated. The user may move, e.g., carry, the remote vehicle control 140 within the area to control other vehicles in the non-autonomous mode.

Figure 4A:
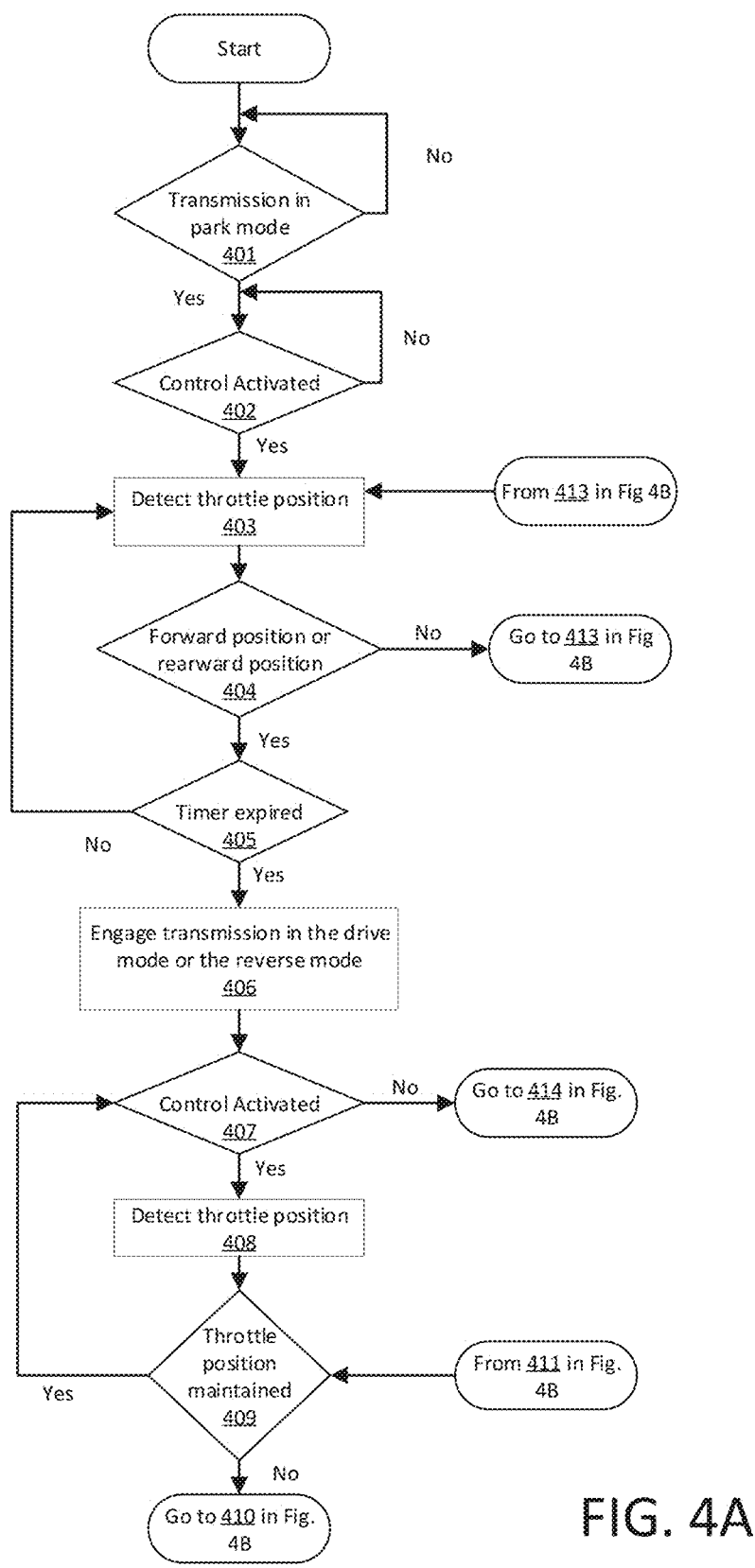
FIG. 4A is a first part of a flow chart of an exemplary process to engage a transmission of the vehicle with the remote vehicle control.

FIG. 4A illustrates part of a flowchart of an exemplary process 400 (because the entire flowchart will no fit on a single drawing sheet) that can be implemented in the vehicle computer 110 to receive the throttle position from the remote vehicle control 140 and to operate the vehicle 105 in the non-autonomous mode based on the throttle position.

The process 400 begins in a decision block 401, in which the computer 110, e.g., according to data on a CAN bus or the like, detects that the transmission 125 is in a park mode. For example, the vehicle 105 is stationary, i.e., the vehicle speed is below the speed threshold, and the transmission 125 prevents movement of the vehicle 105, e.g., by locking the wheels of the vehicle 105. If the transmission 125 is in the park mode, then the process 400 continues to a block 402. Otherwise, the process 400 remains in the block 401.

Next, in the decision block 402, the computer 110 determines whether the remote vehicle control 140 is activated. For example, the remote vehicle control 140 can transmit data including commands to (and receive data from) the vehicle computer 110, e.g., through wired or wireless communications, when the remote vehicle control 140 is activated. In other words, the activation of the remote vehicle control 140 initiates communication between the remote vehicle control 140 and the vehicle computer 110, e.g., sending of a "handshake" request in which the control 140 transmits a wireless message to the computer 110 asking for a response and initiation of an authentication protocol; the computer 110 can respond by acknowledging the activation or initiation message from the remote control, whereupon the computer 110 can authenticate the control 140 according to conventional authentication mechanisms such as exchange of security keys that can be used in conjunction with a stored private key, user input of a password or the like, biometric authentication of a user of the control 140, etc.

The remote vehicle control 140 is typically activated when the user engages activation means such as the switch 161, although other mechanisms, e.g., a power switch, etc., are possible. As set forth above, the user may activate the remote vehicle control 140 by holding the remote vehicle control 140, e.g., by pressing the switch 161 with a finger, contacting the switch 161 with the palm of a hand, etc. Additionally, when the switch 161 is engaged, the computer 110 can authenticate the remote vehicle control 140 to prevent an intruder computer from operating the vehicle 105 in the non-autonomous mode. Once the remote vehicle control 140 is activated and authenticated, the computer 110 can control the vehicle 105 based on a throttle position transmitted from the remote vehicle control 140.

The computer 110 can communicate with one remote vehicle control 140 at any given time. For example, one remote vehicle control 140 of a plurality of remote vehicle controls 140 may be activated. In these circumstances, the computer 110 can authenticate and communicate with the one remote vehicle control 140. The computer 110 can be prevented from communicating with other remote vehicle controls 140 until the one remote vehicle control 140 is deactivated.

Further, the computer 110 changes the operating mode from the autonomous mode to the non-autonomous mode when the remote vehicle control 140 is activated and authenticated. For example, the computer 110 actuates the transmission controller to engage the transmission 125 in the neutral mode. If the remote vehicle control 140 is activated and authenticated, then the process 400 continues to a block 403. Otherwise, the process 400 remains in the block 402.

Next, in the block 403, the computer 110 detects the throttle position. For example, the throttle 162 is in the standstill position under normal conditions, i.e., without user input. The throttle 162 can receive user input to adjust the throttle position, e.g., to one of the forward position or the rearward position. The remote vehicle control 140 can transmit the throttle position to the computer 110. Additionally, the computer 110 can detect the steering position, e.g., of the throttle 162 or other steering control. For example, the throttle 162 can be moved to one of the left position or the right position by user input. In these circumstances, the remote vehicle control 140 can transmit the steering position to the computer 110 and the computer 110 can actuate a steering component to steer the vehicle 105.

Next, in a decision block 404, the computer 110 determines whether the throttle 162 is in one of the forward position or the rearward position. For example, the throttle may be moved, e.g., along the y-axis, by the user to one of the forward position or the rearward position. If the throttle 162 is in the standstill position, then the process 400 returns to block 413. Otherwise, the process 400 continues in a block 405.

Next, in the decision block 405, the computer 110 determines whether the timer has expired. The timer, as explained above, is activated when the vehicle speed is below the speed threshold. The timer begins when the throttle position is moved from the standstill position to one of the forward position and the rearward position. For example, the computer 110 can determine that the throttle position changes prior to the expiration of the timer. In these circumstances, the user can move the throttle 162 from one of the forward position or the rearward position to the other of the forward position or the rearward position prior to the expiration of the timer (or the standstill position). Alternatively, the timer can be in the remote vehicle control 140. For example, a processor of the remote vehicle control 140 can be programmed to determine that the throttle position changes prior to the expiration of the timer. In this instance, the remote vehicle control 140 refrains from transmitting the throttle position to the computer 110. If the throttle position changes prior to the expiration of the timer, then the process 400 returns to the block 403. Otherwise, the process 400 continues to a block 406.

Next, in the block 406, the computer 110 actuates the transmission controller to engage the transmission 125 in one of the drive mode or the reverse mode. For example, the computer 110 actuates the transmission controller to engage the transmission 125 in the drive mode when the throttle 162 remains in the forward position at the expiration of the timer. The vehicle 105 can be propelled forward when the transmission 125 is in the drive mode. As another example, the computer 110 actuates the transmission controller to engage the transmission 125 in the reverse mode when the throttle 162 remains in the rearward position at the expiration of the timer. The vehicle 105 can be propelled backwards when the transmission 125 is in the reverse mode.

Further, as the computer 110 operates the vehicle 105 in one of the drive mode and the reverse mode, the vehicle speed may increase above the speed threshold. The computer 110 can deactivate the timer when the vehicle speed is above the speed threshold, as set forth above. In these circumstances, the remote vehicle control 140 can transmit the throttle position to the computer 110 as the throttle position changes, e.g., in substantially real-time, and the computer 110 can control the vehicle 105, e.g., turning, propelling, or braking the vehicle 105, based on the throttle position, e.g., in real-time.

Next, in a decision block 407, the computer 110 determines whether the remote vehicle control 140 is activated. For example, the switch 161 can be disengaged, e.g., the user may release the switch 161 and/or the remote vehicle control 140. The computer 110 stops communicating with the remote vehicle control 140 when the switch 161 is disengaged, i.e., when the remote vehicle control 140 is deactivated. If the remote vehicle control 140 is deactivated, the process 400 continues in a block 414. Otherwise, the process 400 continues in a block 408.

Next, in the block 408, the computer 110 detects the throttle position. For example, the throttle 162 is in the standstill position under normal conditions, i.e., without user input. The throttle 162 can receive user input to adjust the throttle position, e.g., to one of the forward position or the rearward position. The remote vehicle control 140 can transmit the throttle position to the computer 110.

Next, in a decision block 409, the computer 110 determines whether the throttle position is maintained. A general rule in one example is that the throttle position is maintained when the throttle position remains in the same position, e.g., one of the forward position or the rearward position, as in the block 404. In other words, the computer 110 can compare the throttle position detected in the block 404 to the throttle position detected in the block 408. For example, the throttle position is maintained when the throttle 162 is in the forward position and the transmission 125 is in the drive mode. As another example, the throttle position is maintained when the throttle 162 is in the rearward position and the transmission 125 is in the reverse mode. The user can move the throttle 162 from one of the forward position or the rearward position to the other of the forward position or the rearward position while the vehicle speed is above the speed threshold, i.e., while the transmission 125 is engaged in one of the drive mode or the reverse mode. If the throttle position is maintained, e.g., in one of the forward position or the rearward position, then the process 400 returns to the block 407. Otherwise, the process 400 continues to a block 410.

Figure 4B:
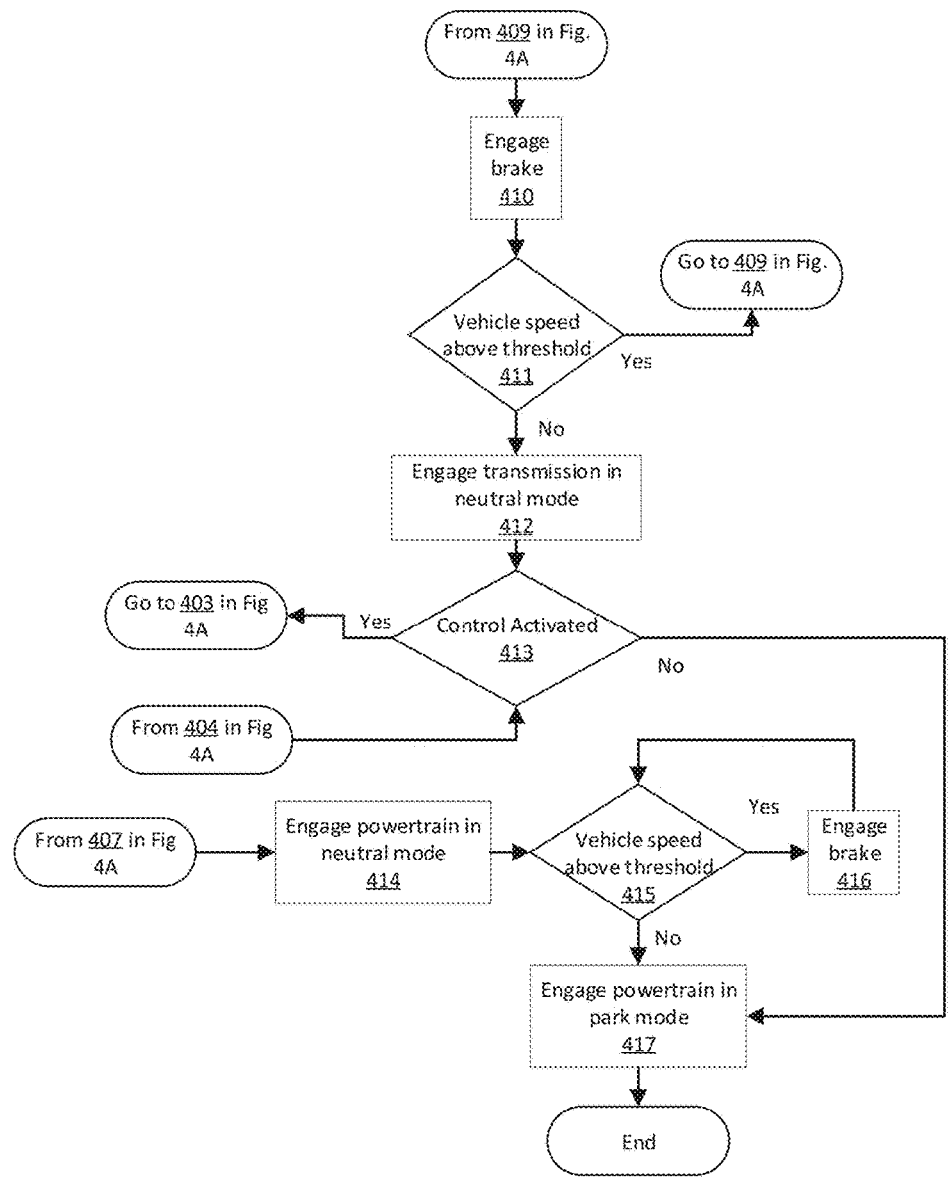
FIG. 4B is a second part of the flow chart of FIG. 4A.

FIG. 4B is a second part of the flowchart of the exemplary process 400. Following the block 409 shown in FIG. 4A, next, in a block 410, the computer 110 actuates a brake controller to engage a brake component to reduce the vehicle speed. The computer 110 can actuate the brake controller to engage the brake component while the throttle position remains in the other of the forward position or the rearward position and the vehicle speed is above the speed threshold.

Next, in a block 411, the computer 110 determines whether the vehicle speed is above the speed threshold. The sensors can transmit the vehicle speed to the computer 110, and the computer 110 compares the vehicle speed to the speed threshold. If the vehicle speed is above the speed threshold, then the process 400 returns to the block 409. Otherwise, the process continues to the block 412.

Next, in the block 412, the computer 110 actuates the transmission controller to engage the transmission 125 in the neutral mode. Further, the computer 110 activates the timer.

Next, in a block 413, the computer 110 determines whether the remote vehicle control 140 is activated. For example, the switch 161 can be disengaged, e.g., the user may release the switch 161 or the remote vehicle control 140. The computer 110 stops communicating with the remote vehicle control 140 when the switch 161 is disengaged, i.e., when the remote vehicle control 140 is deactivated. If the remote vehicle control is deactivated, the process 400 continues in a block 417. Otherwise, the process 400 returns to the block 403.

In the block 414, the computer 110 actuates the transmission controller to engage the transmission 125 in the neutral mode. The computer 110 can actuate the transmission control to engage the transmission 125 in the neutral mode regardless of the vehicle speed when the remote vehicle control 140 is deactivated. For example, the transmission 125 can be engaged in the neutral mode when the vehicle speed is above the speed threshold. Alternatively, the transmission 125 can be engaged in the neutral mode when the vehicle speed is below the speed threshold.

Next, in a block 415, the computer 110 determines whether the vehicle speed is above the speed threshold. The sensors can transmit the vehicle speed to the computer 110, and the computer 110 compares the vehicle speed to the speed threshold. If the vehicle speed is above the speed threshold, then the process 400 continues to a block 417. Otherwise, the process continues to a block 418.

Next, in the block 417, the computer 110 actuates a brake controller to engage a brake component to reduce the vehicle speed. For example, the computer 110 can actuate the brake controller to engage the brake component until the vehicle speed is below the speed threshold.

Next, in the block 418, the computer 110 actuates the transmission controller to engage the transmission 125 in the park mode. The computer 110 changes the operating mode of the vehicle 105 from the non-autonomous mode to the autonomous mode. The process 400 ends following the block 417.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer comprising a processor and a memory, the memory storing instructions executable by the processor to:
   upon detecting that a remote vehicle control is activated, and a throttle position on the control is maintained for a specified time, engage a transmission of a vehicle based on the throttle position; and
   upon detecting the remote vehicle control is deactivated and that the vehicle speed is below a threshold, engage the transmission in a park mode.

2. The system of claim 1, wherein the throttle is moveable between a forward position, a rearward position, and a standstill position between the forward position and the rearward position.

3. The system of claim 2, wherein the computer is programmed to detect that the throttle is in the standstill position, and, then, engage the transmission in a neutral mode.

4. The system of claim 2, wherein the computer is programmed to detect that the throttle is moved from the standstill position to one of the forward position or the rearward position, and, then, engage the transmission in one of a drive mode or a reverse mode.

5. The system of claim 4, wherein the computer is programmed to detect that the throttle is moved from one of the forward position or the rearward position to the other of the forward position or the rearward position, and, then, engage a brake.

6. The system of claim 1, wherein the computer is programmed to, upon detecting that a vehicle speed is above a threshold, deactivate a timer.

7. The system of claim 6, wherein the computer is programmed to, upon detecting that the vehicle speed is below the threshold, activate the timer.

8. The system of claim 1, wherein the computer is programmed to, upon detecting the throttle position is changed prior to the specified time and that a vehicle speed is below a threshold, maintain the transmission in a neutral mode and reset a timer.

9. The system of claim 1, wherein the computer is programmed to, upon detecting the transmission is in a park mode and the control is activated, engage the transmission in a neutral mode and detect the throttle position on the control.

10. A system comprising a computer comprising a processor and a memory, the memory storing instructions executable by the processor to:
upon detecting that a remote vehicle control is activated, and a throttle position on the control is maintained for a specified time, engage a transmission of a vehicle based on the throttle position; and
upon detecting that a vehicle speed is above a threshold, deactivate a timer.

11. The system of claim 10, wherein the computer is programmed to, upon detecting that the vehicle speed is below the threshold, activate the timer.

12. The system of claim 10, wherein the throttle is moveable between a forward position, a rearward position, and a standstill position between the forward position and the rearward position.

13. The system of claim 12, wherein the computer is programmed to detect that the throttle is in the standstill position, and, then, engage the transmission in a neutral mode.

14. The system of claim 12, wherein the computer is programmed to detect that the throttle is moved from the standstill position to one of the forward position or the rearward position, and, then, engage the transmission in one of a drive mode or a reverse mode.

15. The system of claim 14, wherein the computer is programmed to detect that the throttle is moved from one of the forward position or the rearward position to the other of the forward position or the rearward position, and, then, engage a brake.

16. A system comprising a computer comprising a processor and a memory, the memory storing instructions executable by the processor to:
upon detecting that a remote vehicle control is activated, and a throttle position on the control is maintained for a specified time, engage a transmission of a vehicle based on the throttle position; and
upon detecting the throttle position is changed prior to the specified time and that a vehicle speed is below a threshold, maintain the transmission in a neutral mode and reset a timer.

17. The system of claim 16, wherein the throttle is moveable between a forward position, a rearward position, and a standstill position between the forward position and the rearward position.

18. The system of claim 17, wherein the computer is programmed to detect that the throttle is moved from the standstill position to one of the forward position or the rearward position, and, then, engage the transmission in one of a drive mode or a reverse mode.

19. The system of claim 18, wherein the computer is programmed to detect that the throttle is moved from one of the forward position or the rearward position to the other of the forward position or the rearward position, and, then, engage a brake.

* * * * *